March 26, 1935. E. G. BODEN 1,995,832
LUBRICANT TESTING MACHINE
Filed April 22, 1932 2 Sheets-Sheet 1
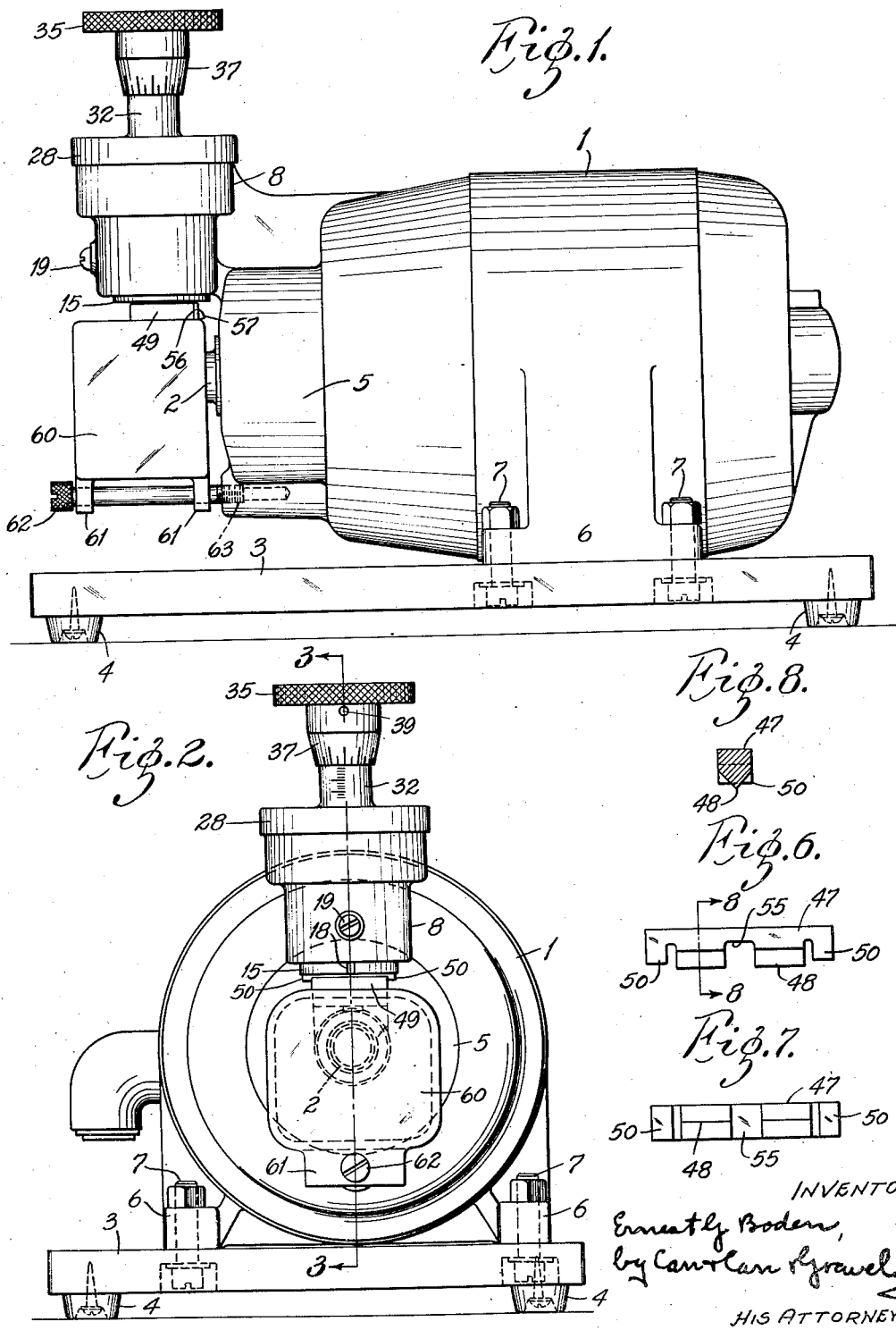

March 26, 1935.   E. G. BODEN   1,995,832
LUBRICANT TESTING MACHINE
Filed April 22, 1932   2 Sheets-Sheet 2
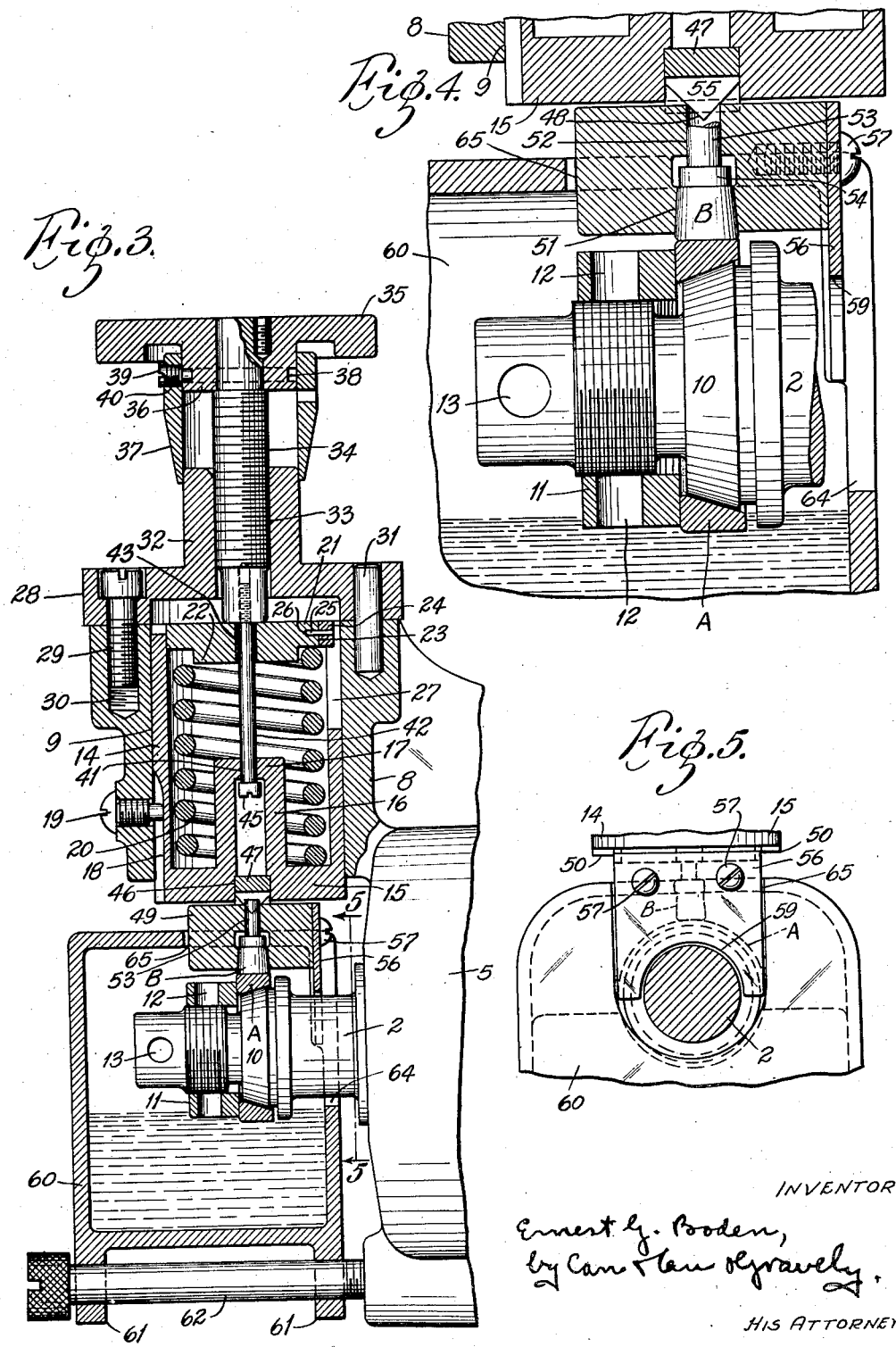

Patented Mar. 26, 1935

1,995,832

UNITED STATES PATENT OFFICE 1,995,832

LUBRICANT TESTING MACHINE

Ernest G. Boden, Canton, Ohio, assignor to The Timken Roller Bearing Company, Canton, Ohio, a corporation of Ohio Application April 22, 1932, Serial No. 606,800

8 Claims. (Cl. 265—10)

My invention relates to testing machines, particularly to a machine for testing different kinds of lubricants to determine load-carrying capacities thereof. It further relates to a machine for testing different kinds of materials to determine resistance capacities thereof to scuffing and abrading caused by lubricants; and the principal object of this invention is to provide a simple and portable testing machine for readily determining such capacities.

The invention consists principally in employing a calibrated coil spring arranged to press a test piece against a rotatable test ring, and supporting the test parts and the spring in such manner that the pressure between the test parts can be readily determined and easily varied. The invention also consists in the testing machine and in the parts, combinations and arrangements of parts hereinafter described and claimed.

In the accompanying drawings, which form part of this specification, and wherein reference symbols refer to like parts wherever they occur, Fig. 1 is a side view of a testing machine embodying my invention, Fig. 2 is a front view of the testing machine shown in Fig. 1, Fig. 3 is a vertical sectional view along the line 3—3 in Fig. 2, Fig. 4 is an enlarged fragmentary view of the lower central portion of Fig. 3 with parts broken away, showing the manner in which the test piece is held in contact with the test ring, Fig. 5 is a vertical sectional view along the line 5—5 in Fig. 3, Fig. 6 is a front side view of a fulcrum block for transmitting the spring pressure exerted by the calibrated spring to the part of the testing machine which holds the test piece, Fig. 7 is a bottom view of Fig. 6; and Fig. 8 is a vertical sectional view along the line 8—8 in Fig. 6.

In the construction illustrated, I have shown a motor comprising a housing 1 with an armature shaft 2 journalled therein. The motor housing is mounted on a rectangular base plate 3 supported at each corner by leg members 4 secured to the underside of the base plate. The central part of the front end of the motor housing is bulged outwardly to form a reduced bell-shaped end portion 5, and the front end of the motor armature shaft 2 extends outwardly through the center thereof. The sides of the motor housing 1 have supporting legs or brackets 6 formed integrally therewith, which are flanged outwardly at their lower ends for receiving bolts 7 for securing the housing 1 to the base plate 3. The front end of the motor housing has a horizontal bracket 8 formed integrally therewith and extending therefrom so as to overhang the front end of the armature shaft 2. This bracket is enlarged and bored out at its end to form a vertically disposed cylindrical opening 9 therethrough whose center line intersects, and extends at right-angles to the axis of rotation of the armature shaft.

The end of the armature shaft 2 directly below the opening in the overhanging bracket 8 is tapered toward its outer end to form a conical portion 10 for receiving a test ring A having a correspondingly tapered bore. A portion of the armature shaft 2 adjacent to the outer end of its conical portion 10 is threaded, and an internally threaded ring 11 is assembled thereon so that the inner end of the ring 11 abuts against the larger end of the test ring A to hold the same firmly on the shaft. The holding ring is provided with a series of radial openings 12 for receiving a pin wrench to help in screwing the holding ring 11 on the shaft 2, and the armature shaft is provided with a diametrical opening 13 near its outer end for receiving another pin wrench to keep the motor shaft from rotating when the holding ring 11 is being screwed thereon.

Slidably mounted in the opening 9 in the overhanging bracket is a plunger member 14 comprising a hollow cylindrical casing having a closed bottom 15 and an upright, centrally located tubular core portion 16 with a closed top 17 in the lower part of the casing. The outer periphery of the plunger 14 has a longitudinal groove 18 therein adjacent to its lower end, and a set screw 19, extending through the wall of the bracket opening 9, has a reduced end portion which extends in said groove 18 to prevent the cylindrical plunger 14 from rotating within the opening 9, but allowing it to slide vertically therein. A calibrated coil spring 20 is mounted within the plunger with its lower end resting on the bottom portion 15 thereof. A disc member 21 is slidably mounted within the top part of the plunger, and the underside of this disc member engages the upper end of the coil spring 20 and has a short cylindrical, central stem portion 22 which is surrounded by the top loop of the coil spring. The disc member, which constitutes a spring cap, is provided with a notch 23 in its periphery for receiving a rectangular key member 24 which is held in said notch 23 by a small dowel pin 25 extending through the key member 24 and into a radial opening 26 in the spring cap, and the cylindrical plunger has a longitudinal slot 27 in its upper wall for receiving the outer end portion of the key member 24 to prevent the spring cap from rotating, but allowing it to slide vertically with respect to the plunger.

The upper end of the cylindrical bracket opening 9 is closed by an annular cap 28 which is secured to the wall portion of the bracket surrounding the opening by a screw 29 extending through the closure cap and into a threaded opening 30 provided therefor in the wall portion of the bracket, and also by a dowel pin 31 on the opposite side of the opening from the screw 29. The closure cap 28 is provided with an upright, concentric cylindrical stem portion 32 having a centrally located, threaded opening 33 therethrough, and threaded in this opening 33 is an adjustment screw member 34 having its lower end engaging the top of the spring cap for compressing the coil spring. The upper end of the adjustment screw 34 has a knurled hand knob 35 fixed thereon for manipulating the adjustment screw 34. The underside of this hand knob has a short, cylindrical stem portion 36 of the same diameter as that of the upright stem portion 32 of the closure cap member; and a micrometer sleeve 37 is slidably mounted around these two cylindrical stem portions. The hand knob stem portion 36 has an annular recess 38 around its periphery near its lower end, and a small set screw 39 extends through a threaded, radial opening 40 in the micrometer sleeve 37 and has a reduced end portion which extends into the annular recess 38 in the stem portion 36 of the hand knob. Extending upwardly through an opening 41 in the top 17 of the tubular core 16 within the cylindrical plunger is a stud bolt 42 which extends through a central opening 43 in the spring cap 21 and into a threaded opening in the lower end of the adjustment screw; and this stud bolt 42 has an enlarged head portion 45 for holding the cylindrical plunger in the bracket opening 9.

The bottom of the cylindrical plunger has a diametrical, rectangular groove 46 therein, and into this groove is pressed a narrow, rectangular fulcrum block 47. The fulcrum block between its ends has a downwardly extending projection 48 which is tapered to form a knife-edge disposed at right-angles to the axis of rotation of the armature shaft 2. A rectangular block member 49 for holding a test piece B adapted to engage the test ring is interposed between the bottom of the cylindrical plunger and the top of the test ring, and this test piece holder block 49 has a V-shaped notch in its top for receiving the tapered projection 48 extending from the fulcrum block. The test piece holder block 49 is of less width than that of the fulcrum block 47, and the ends of said fulcrum block are provided with downwardly extending lugs 50 whose inner edges are made flat for engaging the respective side portions of the test piece holder block to prevent the same from moving laterally with respect to the cylindrical plunger. The test piece B is frusto-conical in shape and is wedged in a tapered hole 51 provided therefor in the bottom of the test piece holder block. The bottom of the test piece is made flat so as to have an initial line contact with the outer surface of the test ring A. Communicating with the upper end of the test piece receiving hole 51, in the test piece holder block, is a hole 52 in the top thereof for receiving a pin member 53 having an enlarged end portion 54 which rests on the top of the test piece for knocking the test piece out of its holder block; and the upper end of this knock-out pin extends slightly above the top of the test block holder, and the middle portion of the tapered projection of the fulcrum block is cut away to form a notch 55 for accommodating the extended upper end portion of the knock-out pin.

A shield plate 56 is secured to the inner end of the test block holder by screws 57 extending through the plate and into threaded openings provided therefor in the test piece holder block, and this shield plate 56 extends below the bottom of the test piece holder block and is provided with a semi-circular notch 59 in its end so that the inner edges of the notch surround the top part of the armature shaft.

A lubricant container 60, in the form of a closed box having lugs 61 extending downwardly from the bottom thereof, is removably secured to the front end of the motor housing 1 by means of a screw bolt 62 which extends through the lugs 61 of the box and into a threaded opening 63 provided therefor in the lower front end portion of the motor housing 1. The inner wall of this lubricant box is slotted as at 64 so that the sides of the slot fit snugly around the lower part of the armature shaft and the side edges of the shield plate secured to the test piece holder block; and the upper wall of the lubricant box is also slotted as at 65 so that its edges fit snugly around the front end and the sides of the test piece holder block.

The outer surface of the micrometer sleeve 37 is provided with horizontal graduations, which are arranged to indicate the amount of pressure, preferably in pounds, between the test parts; and the outer surface of the stem portion of the closure cap is provided with vertical graduations to determine the degree of rotation of the adjustment screw; and the size of the coil spring and the pitch of the adjustment screw threads are chosen so that one revolution of the hand knob will compress the coil spring a definite amount to increase the test pressure proportionately.

In the operation of the hereinabove described testing machine, the lubricant box 60 is removed from the motor housing 1, and the lubricant to be tested is placed therein so that the lubricant level almost reaches the bottom of the slot in the wall of the lubricant box. With the test piece B and test ring A properly assembled as hereinabove described, the lubricant box is then attached to the housing so that the bottom portion of the test ring A is partially submerged in the lubricant. The hand knob 35, fixed on the upper end of the adjustment screw, is then rotated in the proper direction until the test parts just contact with each other; after which operation, the micrometer sleeve 37 is rotated until one of its graduations known as the zero mark, matches the graduations on the upright stem portion of the closure cap; and the micrometer sleeve set screw 39 is then fully tightened to cause the micrometer sleeve to rotate with the hand knob. The hand knob is then rotated further until the desired pressure between the test parts is obtained; and the motor is then started to cause the armature shaft 2 to rotate for a definite arbitrary length of time. It is to be noted that, during such rotation of the armature shaft, the lubricant in the lubricant box will be carried by the test ring between the two test parts. After this period of rotation of the armature shaft, the lubricant box is removed, and then the test piece holder block 49 is removed by rotating the hand knob in the proper direction until the spring pressure is entirely relieved; and then rotating it still further to cause the cylindrical plunger 14 and the fulcrum block 47 carried thereby to be lifted far enough away from the test piece holder block so that said block can be readily removed by swinging it sideways around the axis of the motor shaft and then withdrawing it. The width and the depth of the scar worn into the bottom of the test piece B by the test ring are then measured and recorded; and the appearance of the scar is also noted. By comparing the widths and depths and appearances of such scars from two or more test runs while using a different lubricant and a new set of test parts for each test run, a comparison of the load carrying capacities of the lubricants may be made. Also, by using test pieces of different materials and the same lubricant for each kind of material, it is possible to obtain relative abrading and scuffing characteristics of the various materials.

Obviously, numerous changes may be made in the construction hereinabove described without departing from the spirit of my invention, and, accordingly, I do not wish to be limited to the precise construction, and arrangements of parts, shown and described.

What I claim is:

1. A testing machine comprising a rotatable member for receiving a test ring, means for holding a test piece in contact with said ring and permitting said test piece to oscillate in a path extending along the axis of rotation thereof but preventing it from moving laterally with respect to said path, and a spring exerting a pressure on said test piece holding means for pressing said test piece against said test ring.

2. A testing machine comprising a rotatable member for receiving a test ring, means for holding a test piece in contact with said ring and permitting said test piece to oscillate in a path extending along the axis of rotation thereof but preventing it from moving laterally with respect to said path, a coil spring exerting a pressure on said test piece holding means for pressing said test piece against said test ring, adjusting means for varying the amount of pressure exerted by said spring, and means associated with said adjusting means for determining the amount of such pressure.

3. In a testing machine, means for pressing one test part against another comprising a support, a member movable with respect thereto, a spring engaging said movable member, an adjustment screw having threaded engagement with said support for compressing said spring, said support having a stem portion around said adjustment screw, a knob on said adjustment screw having a stem portion facing the other stem portion, and a micrometer sleeve mounted around the two stem portions.

4. In a testing machine, means for pressing one test part against another comprising a support having an elongated hollow portion therein which is closed at one end, a coil spring in said hollow portion, the closed end of said hollow portion having an outwardly extending stem portion provided with a threaded opening therethrough communicating with the hollow portion in the support, an adjustment screw in said threaded opening for compressing said spring, a hand knob on said adjustment screw having a stem portion extending toward the other stem portion, a micrometer sleeve mounted around the two stem portions, and means for holding said spring in said support and adapted to transmit the pressure exerted by said spring to the test parts.

5. In a testing machine, means for pressing one test part against another comprising a support having an opening therethrough, a coil spring in said opening, a cap closing one end of said opening and having an outwardly extending stem portion provided with a threaded opening therethrough, an adjustment screw in said threaded opening for compressing said coil spring, a hand knob on said adjustment screw having a stem portion facing the stem portion of the closure cap, a micrometer sleeve mounted around said stem portions, and means for holding said spring in said support and transmitting the pressure exerted by said spring to the test parts.

6. In a testing machine, means for pressing one test part against another comprising a support having an opening therethrough, a hollow cylindrical plunger slidably mounted in said opening, a coil spring in said plunger, a cap closing one end of said opening and having an outwardly extending cylindrical stem portion provided with a threaded opening therethrough, a spring cap slidably mounted in said plunger between the closure cap and the coil spring, an adjustment screw in the threaded opening through the stem portion of the closure cap for engaging said spring cap to compress said coil spring, a hand knob on said adjustment screw having a cylindrical stem portion extending toward the cylindrical stem portion of the closure cap, a micrometer sleeve slidably mounted around the stem portion of the closure cap and that of the hand knob.

7. A testing machine comprising a base, a motor comprising a housing and a shaft extending therefrom mounted on said base, said housing having a bracket extending therefrom with an opening therethrough above the extended end portion of said shaft, a hollow plunger slidably mounted in said opening, a coil spring in said plunger, a spring cap slidably mounted in said plunger above said coil spring, a closure cap at the top of said opening having an upper stem portion with a threaded opening therethrough, an adjustment screw in said threaded opening engaging said spring cap to compress the coil spring in the plunger, a hand knob fixed on the upper end of said adjustment screw and having a lower stem portion of the same diameter as that of the stem portion of said closure cap, a micrometer sleeve slidably mounted around the two stem portions of the closure cap and the hand knob, respectively, means provided on said shaft for removably fixing a test ring thereon, a block member interposed between the bottom of said plunger and said test ring for holding a test piece in contact therewith, and a fulcrum block carried by said plunger and having a tapering knife edge projection engaging the test piece holder block.

8. A testing machine comprising a base, a motor comprising a housing and a shaft extending therefrom mounted on said base, means on said shaft for receiving a test ring, a block member for holding a test piece in contact with said test ring, said housing having a bracket extending therefrom and overhanging the extended portion of said shaft, a hollow plunger slidably mounted on said bracket, a fulcrum block carried by said plunger and engaging said test piece holder, a spring in said plunger, an adjustment screw having threaded engagement with said bracket for compressing said spring, and a lubricant container removably attached to said housing and having its walls surrounding the test parts.

ERNEST G. BODEN.